United States Patent Office 3,401,084
Patented Sept. 10, 1968

3,401,084
RUBELLA VACCINE AND ITS PREPARATION
Eugene B. Buynak, North Wales, and Maurice R. Hilleman, Lafayette Hill, Pa., assignors to Merck & Co., Inc., Rahway, N.J., a corporation of New Jersey
No Drawing. Filed July 29, 1965, Ser. No. 475,865
5 Claims. (Cl. 195—1.3)

ABSTRACT OF THE DISCLOSURE

Rubella virus is grown in successive passages in tissue culture prepared with embryonated duck eggs until the live virus is so attenuated that it is avirulent but still immunogenic; it is used to make a vaccine.

---

This invention relates to vaccines and particularly to an attenuated, live rubella virus which is to be inoculated in humans to protect them against rubella which is commonly known as German measles. The invention also includes the development of the attenuated virus strain.

Due to the attenuated nature of the virus, it causes only extremely mild febrile and other clinical reaction. It does, however, evoke a high level of antibody against the virus in man and in animals and this antibody is essential to protection against infection with the virus and disease.

Rubella is usually a mild disease of children although complications such as encephalitis, arthritis, and neuritis may occur. Permanent mental impairment is less frequent than with ordinary red measles (rubeola).

The serious aspect of the disease is delay until adulthood with infection of women in the first trimester of pregnancy. The virus infects the fetus with resultant faulty embryo development including mircocephaly, deaf mutism, eye defect, heart malformation and dental abnormality.

So real is the danger of rubella to the fetus during the first two to three months of gestation that it has been suggested that young girls be exposed to the disease so as to have it before their reproductive period. The attenuated virus vaccine of the present invention makes possible immunization on a known basis.

In general terms, the invention is concerned with the adaptation and propagation of rubella virus in tissue cultures prepared from embryonated duck eggs. More particularly this invention is directed to the development of a live attenuated rubella virus vaccine following serial passage in duck embryo tissue culture. This procedure involves the steps; A, the isolation of the virulent virus in any of a variety of cells in culture, and its adaptation to duck embryo cell culture; B, the development of the attenuated live virus by a plurality of serial passages in duck embryo tissue, and C, the preparation of the vaccine from this attenuated live virus. These steps will be separately explained.

A. Isolation and adaptation of virulent virus

Isolation and adaptation of rubella virus can be accomplished in duck embryo tissue culture using clinical material (e.g., throat swab) or virus previously propagated in another kind of cell culture, such as monkey kidney or embryonated eggs. Incubation of infected cultures can be carried out at any temperature between 30° C. and 38° C. preferably at 30–34° C. (optimal 32° C.) or at 35–38° C. (optimal 36° C.). Representative isolation procedures are the following:

Procedure 1.—Rubella virus is isolated in duck embryo tissue culture from clinical material, i.e., from throat swabbings of persons known to have rubella.

Procedure 2.—Rubella virus from clinical material is isolated in grivet monkey kidney tissue culture.

B. Development of attenuated live rubella virus vaccine

The virus which has been established in A to be rubella virus, is added to glass bottles containing duck embryo tissue culture prepared from minced and trypsinized approximately ten-day-old duck embryos. The culture medium may be any of those which supports cell growth and this may for example be the known medium 199 to which calf serum has been added. After the addition of the virus the infected cell cultures are incubated in successive passages at 30 to 38° C. and preferably at 30–34° C. (optimal 32° C.) and 35–38° C. (optimal 36° C.). During these passages the virus is replicated in large amount and becomes attenuated.

The above serial passages were preformed using undiluted or diluted inoculum and multiple harvest were collected at various intervals. Titrations were performed in grivet monkey kidney tissue cultures. At appropriate intervals cultures were challenged with approximately 1000 $TCID_{50}$ of a virus demonstrating interference properties ($ECHO_{11}$, Bunyamwera, etc.). Tube cultures showing absence of challenge virus cytopathology 3 to 4 days post-challenge were considered to be infected with rubella virus.

The virus is then harvested and stored frozen or at other low temperature so as to preserve the infectiousness of the agent.

C. The rubella virus harvested after this repeated serial passage was found to be nonpathogenic for monkeys and rodents, to cause only very mild illness in human recipients, and to evoke a satisfactory level of neutralizing antibody. The virus infectivity is stabilized by a suitable stabilizer such as sucrose, human albumin, glutamine, phosphate or mixtures thereof. After titration to establish its potency, the virus pool is subdivided and filled into ampules for use. The product can be stored and dispensed frozen or preferably dried from the frozen state and kept free of moisture.

Illustrative examples are the following:

EXAMPLE I

The initial inoculum is that obtained from Procedure 1 described above.

Nine to eleven day-old duck embryos, after removal of the head and extremities are finely minced under aseptic conditions and the minced tissue is washed in several changes of Hanks' BSS. The washed tissue is trypsinized at 36° C. using 0.25% trypsin (Difco 1:250) in tris saline buffer for two to three hours. The trypsin-cell suspension is harvested through two thicknesses of sterile cheese cloth and centrifuged at 1500 r.p.m. for five minutes. Packed cells are resuspended in growth medium for counting. Growth medium consisted of medium 199 (Morgan, J. F., Morton, H. J., and Parker, R. C., Proc. Soc. Exp. Biol. and Med., 73: 1–8, 1950) containing 2% agamma calf serum (heated 56° C.–30 minutes) and 50 mcg./ml. Neomycin. Bottle cultures are planted at a concentration of 350,000 viable cells per milliliter. Following incubation at 36° C. for 36 to 48 hours, bottle culture can be used for serial passage or vaccine preparation.

Duck embryo tissue cultures are prepared in glass bottles using medium 199 containing 2% inactivated calf serum as growth medium. Three to four days postplanting, the growth medium is drawn off aseptically, and the bottle cultures are washed four times with Hanks' BSS, 100 milliliters per wash, and inoculated with 2.5 milliliters of the above mentioned undiluted seed rubella virus per bottle. Sixty milliliters of medium 199 containing 10% of suitable viral infectivity stabilizer is added to each bottle culture and the bottles incubated at 30–34° C. Neomycin at a concentration of 50 mcg./ml. is incorporated in the growth and maintenance medium. Multiple harvests are collected at 2–4 day intervals and the bottle cultures are refed with fresh maintenance medium containing the above-mentioned stabilizer. Ten successive passages are performed, all at the approximate temperature of 32° C. Infectivity titrations of each harvest are performed in grivet monkey kidney tissue cultures. Each harvest is collected aseptically into a sterile container, samples were removed for microbial sterility testing and the remainder is shell frozen in a Dry Ice-alcohol bath. The virus-containing fluids are stored at −70° C. in an electrically operated freezing unit prior to selection of a harvest or harvests for preparation of the vaccine. Appropriate harvest or harvests are selected following completion of infectivity titrations. The selected material is removed from the freezer and thawed. A sample is removed for control and safety testing. The remaining fluid is clarified and a sample removed for monkey safety testing. Appropriate additional stabilizer is added to the remaining fluid. The fluids are distributed into individual vials and dried. Following the drying procedure, the vials are capped and sealed and retained for reconstitution as a vaccine by the addition of sterile water.

The potency of the product is based on demonstration of infectiousness for cell cultures. Additionally, attenuated vaccine inoculated parenterally in monkeys regularly induces a high level of specific neutralizing antibody which persists undiminished for at least a year.

Tests in man.—Seven children without previous rubella infection were given a dose of the atenuated rubella virus vaccine by a parenteral route. All of these developed a high level of neutralizing antibody (1:16–1:64) within a month after vaccination. This antibody titer roughly approximates that which is achieved following the natural disease. The children develop little, if any, fever, a very mild and transient rash, and clinically insignificant lymphodenopathy.

EXAMPLE II

The procedure of Example I is carried out but the incubation of the rubella virus is in the 35–38° C. range and close to 36° C.

EXAMPLE III

The procedure of Example II is carried out but three serial incubations of the virus are made at 36° C. and then seven are made at 32° C.

More than ten successive passages of the virus in the duck embryo tissue culture can be made to further attenuate the virus. Also, the serial passages may include incubation in grivet monkey kidney cultures or in embryonated hens' eggs. This is illustrated by the following examples in which:

GMK represents grivet monkey kidney culture.
EAM represents embryonated hens' eggs.
DEF represents duck embryo tissue culture.

EXAMPLE IV

2GMK+1EAM+9GMK+5DEF
(36° C.)+5DEF (32°C.)

EXAMPLE V

2GMK+1EAM+13GMK+2DEF
(36° C.)+8DEF (32° C.)

EXAMPLE VI

2GMK+1EAM+17GMK+10DEF (32° C.)

EXAMPLE VII

21GMK+3DEF (36° C.)+7DEF (32° C.)

EXAMPLE VIII

Duck embyro tissue culture adapted rubella virus was passed through three terminal dilutions followed by further passages in such tissue culture to produce a vaccine pool.

The invention has been described with particular reference to ten serial passages through DEF to assure attenuation of the virus, but it is to be understood that a fewer number may suffice. Thus, the invention contemplates a single incubation in DEF to achieve the desideratum of a virus which will evoke a rubella antibody response in humans with a reduction in the otherwise severe symptoms of the diease. Successive passages after the first growth in DEF can be expected to result in increased attenuation.

What is claimed is:

1. The process of preparing an attenuated rubella virus vaccine which will evoke in man an antibody repsonse against the virus without causing the severe clinical manifestations of the disease, which comprises passing the virulent virus in tissue culture prepared from embryonated duck eggs a sufficient number of times to attenuate the virus.

2. The process according to claim 1 in which at least ten serial passages are made.

3. The process according to claim 1 in which the duck embryos are 9 to 11 days old.

4. The process according to claim 1 in which the incubation is carried out at 35–38° C.

5. The process according to claim 1 in which the incubation is carried out at 30–34° C.

References Cited

FOREIGN PATENTS 514,782  7/1955  Canada.

OTHER REFERENCES

Kilbourne, Cecil & Loeb: Textbook of Medicine, 9th edition, published by W. B. Saunders Co., Philadelphia, 1957, p. 28, copy in POSL.

Sever et al.: J. Amer. Med. Assoc., vol. 182, No. 6, pp. 663–671, November 1962.

RICHARD L. HUFF, *Primary Examiner.*